United States Patent [19]

Haka

[11] Patent Number: 5,330,038
[45] Date of Patent: Jul. 19, 1994

[54] TORQUE CONVERTER CLUTCH

[75] Inventor: Raymond J. Haka, Rochester, Mich.

[73] Assignee: General Motors Corporation, Detroit, Mich.

[21] Appl. No.: 113,870

[22] Filed: Aug. 27, 1993

[51] Int. Cl.$^5$ .............................................. F16D 33/00
[52] U.S. Cl. .................................. 192/3.29; 192/3.33; 192/57; 464/24
[58] Field of Search ..................... 192/3.29, 3.33, 57, 192/59, 109 F; 464/24

[56] References Cited

U.S. PATENT DOCUMENTS

| | | | |
|---|---|---|---|
| 4,423,803 | 1/1984 | Malloy | 192/3.29 |
| 4,466,518 | 8/1984 | Mueller | 192/3.29 |
| 4,473,145 | 9/1984 | Bopp | 192/3.29 |
| 4,505,365 | 3/1985 | Bopp | 192/3.29 |
| 4,899,859 | 2/1990 | Teraoka | 192/57 X |
| 4,997,071 | 3/1991 | Villata et al. | 192/57 |
| 5,044,477 | 9/1991 | Bojas et al. | 192/3.29 |
| 5,172,796 | 12/1992 | Campbell et al. | 192/3.29 |

FOREIGN PATENT DOCUMENTS 0480267 4/1992 European Pat. Off. ............. 192/57

*Primary Examiner*—Leslie A. Braun
*Assistant Examiner*—Andrea Pitts
*Attorney, Agent, or Firm*—Donald F. Scherer

[57] ABSTRACT

A torque converter clutch has a selectively engageable friction torque transmitting portion and a viscous torque transmitting portion. The friction and viscous portions are serially arranged between a clutch input and a clutch output. Apply pressure enforcing engagement at the friction clutch portion will result in an increase in the torque capacity of the viscous portion when the apply pressure increases. A structural arrangement is provided to increase the apply force of friction portion when the fluid pressure in the viscous portion is increased.

2 Claims, 1 Drawing Sheet

TORQUE CONVERTER CLUTCH

TECHNICAL FIELD

This invention relates to selectively engageable torque converter clutches, and more particularly, to such clutches having a friction clutch and viscous clutch in series drive arrangement.

BACKGROUND OF THE INVENTION

Prior art fluid operated torque converter clutches use spring type dampers, viscous dampers or viscous clutches in series with the fluid operated friction clutch portion, to control the prevention of transmitting engine torsional vibrations.

With the viscous and friction clutch combination, it has been proposed to provide a bypass clutch which is effective to eliminate the viscous clutch under certain conditions.

It is also well known with the prior art devices that internal temperatures of the viscous portion will reduce the torque capacity or gain function of the viscous portion of the clutch. Generally to prevent increase of temperature within the viscous fluid, a multitude of cooling passages are provided, such that the torque converter fluid can be utilized to cool the viscous portion of the clutch.

SUMMARY OF THE INVENTION

It is an object of the present invention to provide an improved torque converter clutch incorporating a viscous clutch which is increased in torque capacity with increased apply pressure of the torque converter clutch.

It is another object of this invention to provide an improved torque converter clutch assembly having serially disposed friction clutch and viscous clutch portions, wherein the viscous clutch portion has an increase in gain characteristic when the apply pressure of the friction clutch is increased.

These and other objects of the present invention will be more readily apparent from the following description and drawings.

DESCRIPTION OF AN EXEMPLARY EMBODIMENT

Figure 1:
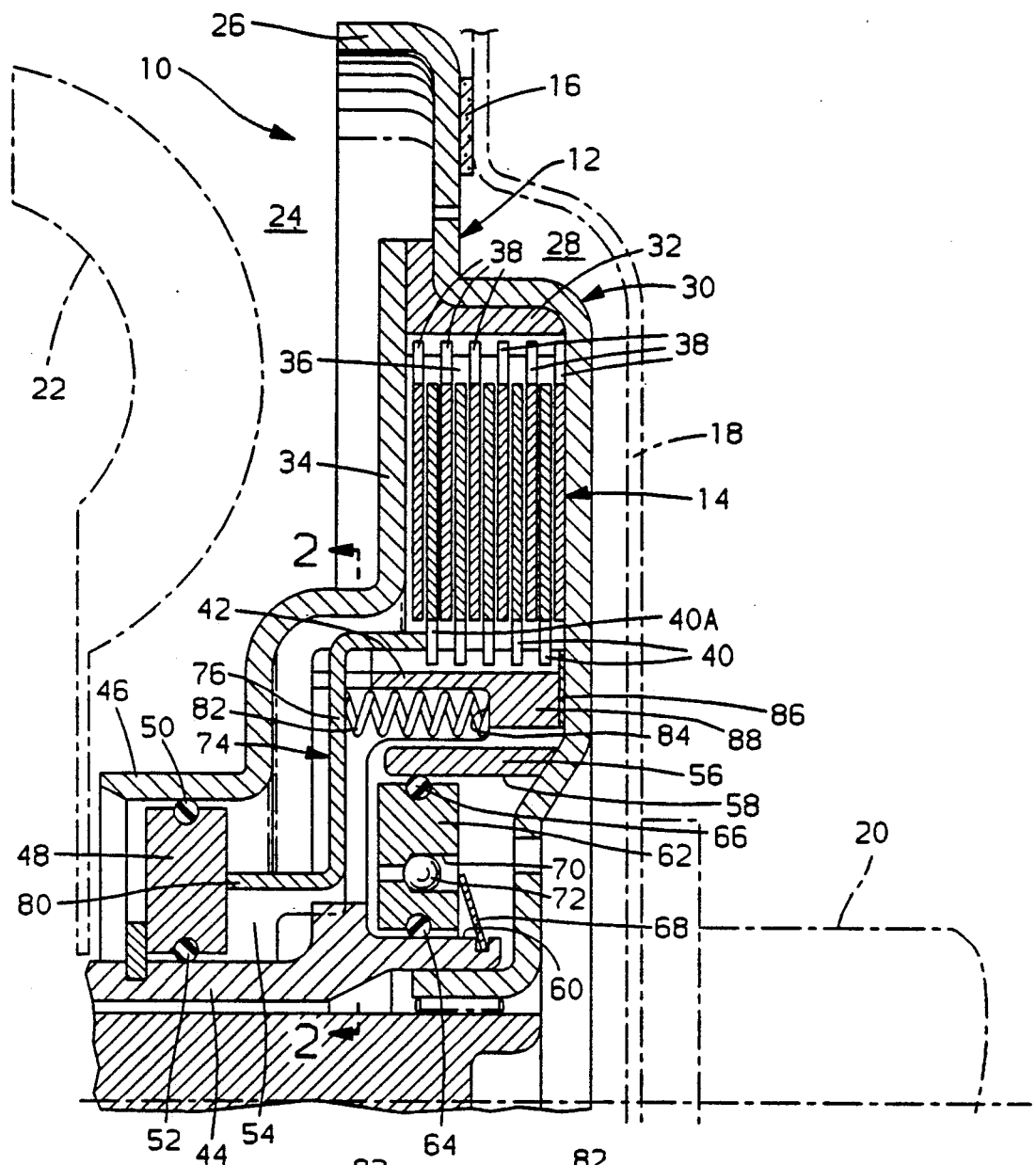
FIG. 1 is a cross-sectional elevational view of a torque converter clutch.
Figure 2:
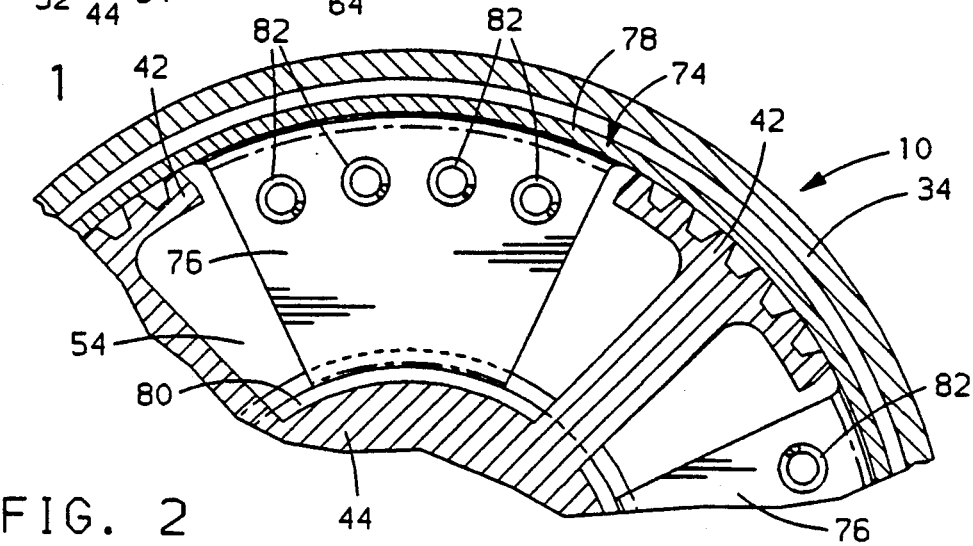
FIG. 2 is a sectional view taken along line 2—2 of FIG. 1.

A torque converter clutch 10, shown in FIGS. 1 and 2, has a friction clutch portion 12 and a viscous clutch portion 14. The friction clutch portion 12 includes an annular friction pad 16, which is adapted to engage a torque converter cover or input shell, shown in phantom at 18. The input shell 18 is driven by an engine, not shown, through a crankshaft 20.

The torque converter clutch 10 is disposed within a chamber defined by the input shell 18 and a torque converter turbine 22. A fluid chamber 24 is disposed between the turbine 22 and an apply plate or pressure plate 26 of the torque converter clutch 10. This chamber 24 is filled with pressurized fluid in a well known manner to enforce engagement of the annular friction pad 16 with the input shell 18 to provide a bypassing drive connection for the torque converter.

The torque converter clutch 10 is disengaged by introducing fluid pressure to a chamber 28 formed between the pressure plate 26 and the input shell 18. The controls and passages utilized to introduce fluid under pressure to the chambers 24 and 28 is well known in the prior art such that a full discussion is not believed needed for an understanding of the present invention.

The pressure plate 26 is a component of an input housing 30 for the viscous portion 14. The housing 30 also includes a spline hub 32 and a closure plate 34. The closure plate 34 and spline hub 32 are secured by welding or other well known means to the pressure plate 26 to form a clutch chamber, generally designated 36.

A plurality of viscous clutch input plates 38 are splined to the spline hub 32 and therefore will rotate with the pressure plate 26. Alternately spaced with the viscous clutch input plates 38 are a plurality of viscous clutch output plates 40. These output plates 40 are drivingly connected to a plurality of spline hubs 42 which are integrally formed with a hub member 44.

The hub member 44 is an annular member which is disposed concentric with a hub 46 formed on the closure plate 34. The space between the hub 46 and hub 44 is filled with an annular piston 48, which has installed therewith a pair of annular seal rings 50 and 52. The piston 48 and seal rings 50 and 52 cooperate with the hubs 44 and 46 to form a fluid chamber 54, which is filled with viscous fluid for circulation between the adjacent clutch plates 38 and 40.

The pressure plate 26 has an annular wall 56 which has an inner sealing surface 58 concentric with a sealing surface 60 formed on the hub 44. An annular piston 62 is disposed in the space between the surfaces 58 and 60 and includes a pair of annular seal rings 64 and 66, which cooperate with the surfaces 60 and 58.

The piston 62 and seals 64 and 66 cooperate with the piston 48 and associated seals to close the chamber 54. The piston 62 is urged inwardly with respect to the chamber 54 by a conventional Belleville spring 68. The piston 62 has one or more openings 70 which may be utilized to introduce viscous fluid, such as silicone oil, into the chamber 54 after assembly of the viscous portion 14 of the clutch 10. The openings 70 are closed by press-fitting a ball 72. In the alternative, the filling structure can be formed on the clutch piston 48.

An apply plate or piston 74 is disposed in the chamber 54 in abutting relationship with the piston 48 and the leftmost plate 40A of the clutch plates 40. The piston 74 has a plurality of segmented arm structures 76 which connect an outer rim 78 with an inner rim 80. These arms 76 are disposed intermediate adjacent hubs 42, such that the plate 74 will rotate in unison with the hub 44.

A plurality of springs 82 are compressed between pockets 84 formed in the hubs 42 and the arms 76 of the plate 74. The springs 82 are effective to urge the hub 44 against a thrust washer 86 disposed between an annular wall 88 which interconnects the hubs 42 and the pressure plate 26 of the friction portion 12.

During operation of the torque converter and clutch assembly, it is desirable at times to engage the torque converter clutch 10 with the input shell 18 thereby improving the overall efficiency of the power transmission. However, when this engagement is accomplished, the engine torsional vibrations are no longer absorbed in the torque converter, such that in many instances, a spring damper is required to control the transmission of these torsional vibrations.

The use of or insertion of the viscous portion 14 between the friction clutch 12 and the output hub 44, which is connected with the torque converter turbine 22, is effective to eliminate the transmission of transient torsional vibrations. This is well known and has been provided in power transmissions sold in the United States for a number of years. However, as the engagement force on the torque converter clutch friction portion 12 increases, it is also desirable to increase the torque capacity or gain of the viscous portion of the clutch.

In order to accomplish this, the piston 48 is responsive to fluid pressure in the chamber 24, such that increased fluid pressure in the chamber 24, the plate 74 will be effective to urge the clutch plates 40 into closer proximity with the clutch plates 38. It is well known that the torque capacity or gain of a viscous clutch is proportional to the space or axial clearance between the rotating components of the clutch. Thus, by reducing the space between plates 40 and 38, the torque capacity of the viscous portion is increased.

The axial movement of the piston 48 also increases the pressure within the chamber 54. This increase in pressure, while it also increases torque capacity, is, in the present invention, made effective to also increase the torque capacity of the friction portion 12. This is accomplished by having the piston 62 react through the spring 68 on the hub 44. This reaction force, in turn, is introduced into the pressure plate 26 via an annular wall 88 in the thrust washer or bearing 86. Thus, the total increase in pressure in the chamber 24 is utilized to increase the torque capacity of the friction portion 12 of the torque converter clutch 10.

The springs 82 are selected such that the apply pressure necessary to move the plate 74 is sufficiently high to ensure that the viscous portion 14 will not be increased in torque capacity prior to the friction portion 12 being engaged with sufficient force to transmit or have higher torque capacity than the viscous portion. By way of example, the plate 74 as opposed by springs 82 can be limited in the beginning of travel to a pressure of 80 psi within the chamber 24. The system is further designed such that full travel might occur at 120 psi. This pressure range is one that is easily achievable within the current automatic transmission. This will permit the clutch gain to be controlled in the viscous portion without the addition of more intricate and involved control valving and mechanism, since the current control systems for power transmissions already have a mechanism in place for controlling the inlet pressure to a torque converter.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A torque converter clutch comprising:
   an input member;
   an output member;
   clutch means disposed between said input and output members for selectively transmitting drive force therebetween, said clutch means comprising:
   friction clutch means having an apply chamber responsive to hydraulic fluid pressure for providing an engagement force on said input member;
   viscous clutch means for transmitting drive forces from said friction clutch means to said output member including;
   housing means secured to said friction clutch means;
   viscous plate input means drivingly connected with said housing means, viscous plate output means drivingly connected with said output member, viscous drive fluid disposed in said housing and cooperating with said viscous plate input means and said viscous plate output means for transmitting drive forces therebetween, first piston means slidably disposed in said housing and being responsive to the pressure in the apply chamber for controlling the drive transmission between said viscous input and output means, first spring means for urging said first piston to reduce the drive force in the viscous clutch and for reacting on said friction clutch means to increase the engagement force with the input member when the pressure in the apply chamber increases.

2. The torque converter clutch defined in claim 1 wherein second spring means is active between a second piston means and said output member to urge the second piston means to increase the pressure in said viscous drive fluid and to increase the engagement force of and said friction clutch means.

* * * * *